United States Patent
Shono et al.

Patent Number: 5,416,182
Date of Patent: May 16, 1995

[54] METHOD FOR PRODUCING SILICON NETWORK POLYMERS

[75] Inventors: Tatsuya Shono; Shigenori Kashimura, both of Kyoto; Ryoichi Nishida, Ikoma; Shinichi Kawasaki, Osaka, all of Japan

[73] Assignee: Osaka Gas Company Ltd., Osaka, Japan

[21] Appl. No.: 64,063

[22] PCT Filed: Sep. 18, 1992

[86] PCT No.: PCT/JP92/01191

§ 371 Date: May 18, 1993

§ 102(e) Date: May 18, 1993

[87] PCT Pub. No.: WO93/06152

PCT Pub. Date: Apr. 1, 1993

[30] Foreign Application Priority Data

Sep. 19, 1991 [JP] Japan .................................. 3-239674

[51] Int. Cl.$^6$ .............................................. C08G 77/00
[52] U.S. Cl. ........................................ 528/10; 528/38; 528/43; 204/157.74
[58] Field of Search ............................ 528/43, 38, 10; 204/157.74

[56] References Cited
FOREIGN PATENT DOCUMENTS

| | | |
|---|---|---|
| 0446578 | 9/1991 | European Pat. Off. . |
| 62-241926 | 10/1987 | Japan . |
| 2105825 | 4/1990 | Japan . |
| 3104893 | 5/1991 | Japan . |
| 3-264683 | 11/1991 | Japan . |
| 4-141596 | 5/1992 | Japan . |

*Primary Examiner*—Melvyn I. Marquis
*Attorney, Agent, or Firm*—Cushman Darby & Cushman

[57] ABSTRACT

This invention provides
(1) a method for producing a silicon network polymer which comprises subjecting a trihalosilane to the electrode reaction using a perchlorate as the electrolyte, an aprotic solvent as the reaction solvent, Mg, Cu or Al as one electrode material and an electronically conductive material which is the same as or different from said one electrode as a counter electrode material with the polarity of electrodes being switched from time to time, and
(2) a method for producing a silicon network polymer which comprises subjecting a trihalosilane to concurrent sonication and electrode reaction using a perchlorate as the electrolyte, an aprotic solvent as the reaction solvent, Mg, Cu or Al as one electrode material and an electronically conductive material which is the same as or different from said one electrode as a counter electrode material with the polarity of electrodes being switched from time to time.

37 Claims, No Drawings

METHOD FOR PRODUCING SILICON NETWORK POLYMERS

TECHNICAL FIELD

This invention relates to a method for producing silicon network polymers.

BACKGROUND ART

Silicone network polymers are attracting attention as optoelectronic materials, ceramic precursors and so on.

Heretofore, a linear polysilane containing Si—Si linkages in the backbone chain has been synthesized from a dichlorosilane as the starting compound by heating the starting compound together with sodium metal at a temperature not below 100° C. A silicon network polymer, however, cannot be synthesized by subjecting a trichlorosilane as such to the same conditions as above. Thus, in order to synthesize a silicon network polymer, it is necessary to modify not only the starting compound but also the reaction conditions. Therefore, a synthetic method employing a sonication technique in combination with a very strong reducing system, e.g. a sodium metal-potassium alloy system (J. Am. Chem. Soc. 110 (1988) 234) and a method using an alkali metal, e.g. sodium metal, and an appropriate auxiliary agent such as 12-crown-4 (Macromolecules 1990, 23, 3423-3426) have been proposed. However, these methods are disadvantageous in that they do not provide for molecular weight control and that the use of alkali in a large amount presents a major safety problem in commercial production runs. Thus, neither of the methods can be utilized for production on a commercial scale.

As a technology for synthesizing linear polysilanes, several processes involving electrode reactions which permit molecular weight control and are safe have been reported (J. Chem. Soc. Chem. Commun., 1990, 1160, Electrochem. Acta, 35, 1867 (1990), Denki Kagaku Oyobi Kogyo Butsuri Kagaku 59, 5, 421 (1991), JP Kokai H-3-104893, etc.). However, none of the above-cited literature consider production of a silicon network polymer and, for that matter, none provide information on how such a silicon network polymer could ever be obtained.

Therefore, the development of an electrode reaction technology for producing silicone network polymers has been awaited.

DISCLOSURE OF INVENTION

In view of the above state of the art, the inventor of this invention did much research and discovered that the serious drawbacks of the known synthetic methods employing an alkali metal are substantially eliminated or alleviated when a trihalosilane is subjected to electrode reaction employing a defined metal as a positive electrode with the polarity of two electrodes switched at predetermined intervals.

It was also found that when the reaction vessel or the reaction mixture is exposed to ultrasonic waves in conducting the electrode reaction, the reaction time is drastically decreased, the molecular weight of the reaction product increased and the production yield also increased in a remarkable degree.

The present invention therefore provides the following methods for producing silicon network polymers.

1. A method for producing a silicon network polymer characterized by subjecting a trihalosilane of general formula $$RSiX_3 \qquad (1)$$

(wherein R represents hydrogen, alkyl, aryl, alkoxy or amino; X represents halogen) to an electrode reaction using a perchloric acid salt as the supporting electrolyte, an aprotic solvent as the reaction solvent, an Mg, Cu or Al electrode as one electrode and an electrode made of an electronically conductive material, which may be the same as or different from said one electrode as the counter electrode, with the polarity of said electrodes being switched from time to time to thereby provide a silicon network polymer of general formula $$[RSi]_n \qquad (2)$$

(wherein R has the meaning defined above and corresponding to the starting compound; n is equal to 10 to 10000).

2. A method for producing a silicon network polymer characterized by subjecting a trihalosilane of general formula $$RSiX_3 \qquad (1)$$

(wherein R represents hydrogen, alkyl, aryl, alkoxy or amino; X represents halogen) to electrode reaction using a perchloric acid salt as the supporting electrolyte, an aprotic solvent as the reaction solvent, Mg, Cu or Al as one electrode material and an electronically conductive material which is either the same as or different from said one electrode material as the counter electrode material with the polarity of the electrodes being switched from time to time under application of ultrasonic waves to thereby provide a silicon network polymer of general formula $$[RSi]_n \qquad (2)$$

(wherein R has the meaning defined above and corresponding to the starting compound; n is equal to 10 through 10000).

Hereinafter, the above inventions (1) and (2) will be referred to as the first invention and the second invention, respectively, and when both are meant collectively as a single invention, the latter will be referred to merely as this invention.

The trihalosilane to be used as the starting compound in accordance with this invention is represented by general formula $$RSiX_3 \qquad (1)$$

(wherein R represents hydrogen, alkyl, aryl, alkoxy or amino; X represents halogen).

The reaction product of this invention is a silicon network polymer of general formula $$[RSi]_n \qquad (2)$$

(wherein R has the meaning defined hereinbefore and corresponding to the starting compound; n is equal to 10 through10000).

Referring to general formula (1), the alkyl includes alkyl groups of about 1 to 10 carbon atoms and preferably of 1 to 6 carbon atoms. The aryl includes phenyl, phenyl substituted by one or more alkyl groups of 1 to 6 carbon atoms, p-alkoxyphenyl, naphthyl, and so on. The alkoxy includes alkoxy groups of about 1 to 10 carbon atoms and preferably of 1 to 6 carbon atoms. Where R is an amino group or an organic substituent group such as mentioned above, at least one of its hydrogen atoms may be substituted by a functional group such as alkyl, aryl, alkoxy and so on.

Referring, further, to general formula (1), X represents halogen (Cl, F, Br, I). The preferred halogen is Cl.

In the method of this invention, one species of said trihalosilane of general formula (1) can be used singly or two or more species be used in combination. The trihalosilane is preferably of high purity and it is preferable that it be purified by distillation before use.

In conducting the reaction, the trihalosilane is dissolved in a solvent and submitted to the reaction. As the solvent, a broad variety of aprotic solvents can be selectively employed. To be specific, propylene carbonate, acetonitrile, dimethylformamide, dimethyl sulfoxide, tetrahydrofuran, 1,2-dimethoxyethane, bis((2-methoxyethyl)ether, p-dioxane, methylene chloride, etc. can be mentioned by way of example. These solvents can be used alone or in combination. Preferably, ethers such as tetrahydrofuran, 1,2-dimethoxyethane, bis(2-methoxyethyl)ether, p-dioxane, etc. are used, either independently or in combination. Particularly preferred solvents are tetrahydrofuran and 1,2-dimethoxyethane. When the concentration of the trihalosilane in the solvent is too low, the current efficiency cannot be sufficiently high, while the supporting electrolyte may not be dissolved when the concentration is too high. Therefore, the useful concentration of the trihalosilane in the solvent is generally about 0.05 to 20 moles/l, preferably about 0.2 to 15 moles/l and more advantageously about 0.3 to 13 moles/l.

The supporting electrolyte for use in this invention includes salts of perchloric acid, such as alkali metal perchlorates, e.g. sodium perchlorate, lithium perchlorate, etc. and tetraalkylammonium perchlorates, e.g. tetra-n-butylammonium perchlorate etc. These supporting electrolytes may be used alone or in combination. Among said supporting electrolytes, lithium perchlorate and tetra-n-butylammonium perchlorate are preferred, and lithium perchlorate is the most advantageous. When the concentration of the supporting electrolyte is too low, the reaction mixture cannot have sufficient ionic conductivity so that the reaction may not proceed with efficiency. When the concentration is too high, the current will flow too well to insure the necessary potential. Therefore, the useful concentration of the electrolyte in the solvent is generally about 0.05 to 5 moles/l, preferably about 0.1 to 3 moles/l, and more advantageously about 0.15 to 1.2 moles/l.

In the first invention, Mg, Cu or Al or an alloy based on such metal is used as one electrode material and an electronically conductive material which is either the same as or different from said one electrode (Ni, Co, Pt, etc.) is used as a counter electrode. The use of electrodes made of the same metal species is more favorable to the synthesis of a silicon network polymer of high molecular weight. This is because the metal ions (e.g. $Mg^{2+}$) which dissolve out from either electrode migrate to the other electrode so that the net consumption of the electrodes is reduced and, hence, a longer current time is realized. It is preferable to use Mg or Al, or an alloy composed predominantly thereof, for both electrodes and it is most advantageous to use Mg for both electrodes. The electrode configuration is not so critical a factor provided that an electric current can be passed in a steady state but an electrode shaped like a rod, a plate, a cylinder or a rolled plate is preferred. Preferably the electrodes are pretreated to remove any surface oxide layer beforehand. Such removal of the surface oxide layer can be achieved by various procedures such as washing the electrode with an acid and ethanol-ether in that order followed by drying under reduced pressure, or polishing the electrode in a nitrogen gas atmosphere, or even by a combination of such procedures.

To carry the first invention into practice, a trihalosilane of general formula (1), a supporting electrolyte and a solvent are placed in a hermetically closable vessel including a couple of electrodes and, preferably with stirring by mechanical or magnetic means, a predetermined amount of electric current is passed across the vessel, with the polarity of the electrodes being switched from time to time, to conduct the electrode reaction. The switching of polarity can be made at intervals of about 1 to 20 seconds in order to maintain a strong reducing environment. The plenum within the reaction vessel should only be a dry atmosphere but is preferably a dry nitrogen or inert gas atmosphere. It is most advantageous to use a deoxygenated dry nitrogen or inert gas atmosphere. The amount of electric current may generally be at least 1 F/mole halogen of the trihalosilane and the molecular weight can be controlled by adjusting the amount of current. It may also be arranged that the silicon network polymer thus produced with a current of at least about 0.1 F/mole is harvested from the reaction system and the residual starting halosilane recovered for reuse. The reaction time is dependent on the amount of starting material trihalosilane, the resistance of the electrolyte solution which is related to the amount of the supporting electrolyte and the desired molecular weight of the silicon network polymer, among other factors, and can therefore be chosen for each production requirement. The reaction temperature is not critical provided that it is below the boiling point of the solvent used.

In the practice of the first invention, a membrane which is usually essential to electrode reduction reactions is not required and this is contributory to simplified operation and other practical advantages.

The second invention is substantially not different from the first invention except that either the reaction vessel or the reaction mixture is exposed to ultrasonic waves during the electrode reaction. The method for applying ultrasonic waves during the electrode reaction is not restricted. Thus, for example, the method of applying ultrasonic waves toward the reaction vessel in a sonicator bath and the method of applying ultrasonic waves with an ultrasonic transducer or ultra sound generator installed in the reaction vessel may be mentioned. The preferred frequency of ultrasonic waves is about 10 to 70 KHz. The ultrasonic output can be chosen according to the reaction conditions such as the species of starting compound, the quantity of the reaction mixture, the configuration and size of the reaction vessel and of the electrodes, the material and surface areas of the electrodes, etc. Generally, however, the usual output is about 0.01 to 24 kW per liter of the reaction mixture. By such application of ultrasonic waves, the reaction time is drastically reduced to about $\frac{1}{3}$ through $\frac{2}{3}$ as compared with the electrode reaction without concomitant application of ultrasonic waves. Moreover, an increased molecular weight and a remarkably improved yield can be realized by this method. In this second invention, application of ultrasonic waves result in satisfactory agitation but mechanical stirring can be applied in addition, if required.

In the practice of this invention, for the purpose of inhibiting the inclusion of atomic oxygen into the polymer backbone, it is recommendable to previously remove any water from the solvent and supporting electrolyte. When tetrahydrofuran or 1,2-dimethoxy ethane, for instanced is used as the solvent, the solvent is preferably dehydrated with benzophenone sodium ketyl, for instance. The supporting electrolyte is also preferably dehydrated under reduced pressure or by addition of a substance which is ready to react with moisture and can be easily removed (e.g. trimethylchlorosilane).

The silicon network polymer of general formula (2), which can be obtained by this invention, usually has an average molecular weight of about 1000 to 1000000 (i.e. n in general formula (2) is equal to about 10 to 10000).

EFFECTS OF INVENTION

In accordance with this invention, the following remarkable effects can be realized.

(a) Since no alkali metal is employed, a silicon network polymer can be produced safely and easily even on a commercial scale.

(b) The molecular weight of the product silicon network polymer can be controlled by adjusting the amount of electric current passed.

(c) Since the electrodes made of stable and safe material are employed, a silicon network polymer can be produced easily and safely without the risk of environmental pollution.

(d) The formation of Si-O-Si bonds in the backbone structure can be substantially inhibited.

(e) Since it is not necessary to use a membrane, there is no trouble of a clogged membrane and the operation is simplified.

(f) When sonication is carried out concurrently with the electrode reaction, the reaction time is drastically reduced to about ⅔ through ⅓ and at the same time, the molecular weight of the product polymer is increased and the production yield is also remarkably increased.

BEST MODE FOR CARRYING OUT THE INVENTION

The following examples are intended to point out the advantageous features of the invention with further clarity.

Example 1

A 1.0 g quantity of anhydrous lithium perchlorate was fed to a 30 ml-capacity three-necked flask (hereinafter referred to as reactor) equipped with a three-way cock and a couple of Mg electrodes (1 cm×1 cm×5 cm; the surface oxide layer previously removed by serial washing with dilute sulfuric acid and ethanol-ether followed by drying under reduced pressure and subsequent polishing under nitrogen). The contents of the reactor were heated under reduced pressure at 50° C. and 1 mmHg (6 hours) followed by dehydration of the lithium perchlorate with trimethylchlorosilane. Then, deoxygenated dry nitrogen gas was introduced into the reactor and 15 ml of tetrahydrofuran previously dehydrated with benzophenone sodium ketyl was added. Using a syringe, 1.6 ml of phenyltrichlorosilane dehydrated with calcium hydride and purified by distillation beforehand was added and while the reactor was maintained at room temperature on a water bath, an electric current was passed using a constant-voltage power source. During this process, using a commutator, the polarity of the electrodes was switched at intervals of 15 seconds. The current was passed for 28 hours until the quantity of electricity had reached 2.0 F/mole chlorine of the phenyltrichlorosilane.

After completion of the reaction, the reaction mixture was diluted with 150 ml of 1N-hydrochloric acid and extracted with ether, followed by reprecipitation using the poor solvent ethanol and good solvent benzene.

As a result, a silicon network polymer with a weight average molecular weight of 9860 was obtained in a yield of 65%. The backbone chain oxygen content of this silicon network polymer was less than 0.1%, indicating that the polymer is very lean in oxygen.

Example 2

The procedure of Example 1 was repeated except that the electrode reaction was carried out with the reactor set in an ultrasonic washer at an output setting of 60 W and a frequency setting of 45 KHz. The current time was 15 hours.

As a result, a silicon network polymer with a weight average molecular weight of 15600 was obtained in a yield of 71%.

Example 3

The electrode reaction was conducted in the same manner as Example 2 except that the tetrahydrofuran charge was 7.5 ml. The current time was 21 hours.

As a result, a silicon network polymer with a weight average molecular weight of 20300 was obtained in a yield of 49%.

Example 4

The electrode reaction was conducted in the same manner as Example 2 except that 15 ml of 1,2-dimethoxyethane dried with benzophenone sodium ketyl beforehand was used as the solvent.

As a result, a silicon network polymer with a weight average molecular weight of 13800 was obtained in a yield of 64%.

Example 5

The electrode reaction of phenyltrichlorosilane was conducted in the same manner as Example 2 except that 3.0 g of tetra-n-butylammonium perchlorate was used as the supporting electrolyte.

As a result, a silicon network polymer with a weight average molecular weight of 12200 was obtained in a yield of 51%.

Example 6

Except that an electric current was passed until the quantity of electricity had reached 1.0 F/mole chlorine, the electrode reaction of phenyltrichlorosilane was carried out in otherwise the same manner as Example 2.

As a result, a silicon network polymer with a weight average molecular weight of 9280 was obtained in a yield of 49%.

Example 7

The electrode reaction of phenyltrichlorosilane was conducted in the same manner as Example 2 except that aluminum (1 cm×0.1 cm×5 cm) was used for both electrodes.

The procedure gave a silicon network polymer similar to the product of Example 2.

Example 8

The electrode reaction of phenyltrichlorosilane was conducted in the same manner as Example 2 except that copper (1 cm×0.1 cm×5 cm) was used for both electrodes.

The procedure gave a silicon network polymer similar to the product of Example 2.

Example 9

The electrode reaction of Example 2 was repeated except that 1.98 ml of n-hexyltrichlorosilane was used as the starting compound of general formula (1).

As a result, a silicon network polymer with a weight average molecular weight of 35600 was obtained in a yield of 39%.

Example 10

The electrode reaction of Example 2 was repeated except that p-tolyltrichlorosilane was used as the starting compound of general formula (1).

As a result, a silicon network polymer with a weight average molecular weight of 14800 was obtained in a yield of 62%.

Example 11

The electrode reaction of Example 2 was repeated except that cyclohexyltrichlorosilane was used as the starting compound of general formula (1).

As a result, a silicon network polymer with a weight average molecular weight of 21000 was obtained in a yield of 41%.

Example 12

The electrode reaction of Example 2 was repeated except that β-phenethyltrichlorosilane was used as the starting compound of general formula (1).

As a result, a silicon network polymer with a weight average molecular weight of 16200 was obtained in a yield of 58%.

Example 13

The electrode reaction was conducted in the same manner as Example 2 except that the polarity of electrodes was switched at 15-second intervals until the quantity of electricity had reached 1.0 F/mole chlorine of the phenyltrichlorosilane and thereafter at 10-second intervals until the quantity of electricity had reached 2.0 F/mole.

As a result, a silicon network polymer with a weight average molecular weight of 14800 was obtained in a yield of 70%.

Example 14

The electrode reaction of Example 2 was repeated except that the polarity of the electrodes was switched at irregular intervals of 1 to 20 seconds.

As a result, a silicon network polymer with a weight average molecular weight of 14000 was obtained in a yield of 65%.

Example 15

The electrode reaction was conducted in the same manner as Example 2 except that 0.8 ml of phenyltrichlorosilane and 1.0 ml of n-hexyltrichlorosilane were used as the starting compounds of general formula (1).

As a result, a silicon network polymer with a weight average molecular weight of 16200 was obtained in a yield of 44%.

We claim:

1. A method for producing a silicon network polymer characterized by subjecting a trihalosilane represented by the general formula (1):

$$RSiX_3$$ 

wherein R represents hydrogen, alkyl, aryl, alkoxy or amino and X represents a halogen, to electrode reaction in the presence of a perchloric acid salt as the supporting electrolyte, an aprotic solvent as the reaction solvent, Mg, Cu, Al or alloys thereof as an electrode material and an electronically conductive material which is the same as or different from said electrode material as a counter electrode material with the polarity of the electrodes being switched at intervals of 1 to 20 seconds to thereby provide a silicon network polymer represented by the general formula (2):

$$(RSi)_n$$ 

wherein R has the meaning defined above corresponding to the starting compound, and n is equal to 10 through 10000.

2. A method for producing a silicon network polymer as claimed in claim 1 wherein R in the trihalosilane of general formula (1) is at least one member selected from the class consisting of alkyl groups of 1 to 6 carbon atoms, alkoxy groups of 1 to 6 carbon atoms, phenyl, phenyl substituted by one or more alkyl groups of 1 to 6 carbon atoms, p-alkoxyphenyl groups and naphthyl.

3. A method for producing a silicon network polymer as claimed in claim 1 wherein X in said trihalosilane of general formula (1) represents chlorine.

4. A method for producing a silicon network polymer as claimed in claim 1 wherein said electronically conductive material is a metal selected from the group consisting of Ni, Co, Pt, Mg, Cu and Al.

5. A method for producing a silicon network polymer as claimed in claim 1 wherein said aprotic solvent is at least one member selected from the class consisting of propylene carbonate, acetonitrile, dimethylformamide, dimethyl sulfoxide, tetrahydrofuran, 1,2-dimethoxyethane, bis(2-methoxyethyl)ether, p-dioxane and methylene chloride.

6. A method for producing a silicon network polymer as claimed in claim 5 wherein said aprotic solvent is at least one member selected from the class consisting of tetrahydrofuran, 1,2-dimethoxyethane, bis(2-methoxyethyl)ether and p-dioxane.

7. A method for producing a silicon network polymer as claimed in claim 6 wherein said aprotic solvent is selected from the group consisting of tetrahydrofuran, 1,2-dimethoxyethane, and mixtures thereof.

8. A method for producing a silicon network polymer as claimed in claim 1 wherein the concentration of said trihalosilane in said solvent is 0.05 to 20 moles/l.

9. A method for producing a silicon network polymer as claimed in claim 8 wherein the concentration of said trihalosilane in said solvent is 0.2 to 15 moles/l.

10. A method for producing a silicon network polymer as claimed in claim 9 wherein the concentration of said trihalosilane in said solvent is 0.3 to 13 moles/l.

11. A method for producing a silicon network polymer as claim in claim 1 wherein the anion moiety of said supporting electrolyte is a perchloric acid moiety.

12. A method for producing a silicon network polymer as claimed in claim 11 wherein said supporting electrolyte is lithium perchlorate and/or tetra-n-butylammonium perchlorate.

13. A method for producing a silicon network polymer as claimed in claim 12 wherein said supporting electrolyte is lithium perchlorate.

14. A method for producing a silicon network polymer as claimed in claim 1 wherein the concentration of said supporting electrolyte in said solvent is 0.05 to 5 moles/l.

15. A method for producing a silicon network polymer as claimed in claim 14 wherein the concentration of said supporting electrolyte in said solvent is 0.1 to 3 moles/l.

16. A method for producing a silicon network polymer as claimed in claim 15 wherein the concentration of said supporting electrolyte in said solvent is 0.15 to 1.2 moles/l.

17. A method for producing a silicon network polymer as claimed in claim 1 wherein the two electrodes are composed of the same metal selected from the class consisting of Mg, Al and their alloys.

18. A method for producing a silicon network polymer as claimed in claim 17 wherein the two electrodes are composed of the same metal selected from the class consisting of Mg and its alloys.

19. A method for producing a silicon network polymer comprising concurrently subjecting a trihalosilane represented by the general formula (1):

$$RSiX_3 \qquad (1)$$

wherein R represents hydrogen, alkyl, aryl, alkoxy or amino and X represents a halogen, to ultrasonic waves and an electrode reaction in the presence of a perchloric acid salt as the supporting electrolyte, and an aprotic solvent as the reaction solvent, Mg, Cu, Al or an alloy thereof as an electrode material and an electrically conductive material which is either the same as or different from said electrode material as a counter electrode material, the polarity of the electrodes being switched at an interval of 1 to 20 seconds to thereby provide a silicon network polymer represented by the general formula (2):

$$(RSi)_n \qquad (2)$$

wherein R has the meaning defined here and above and corresponding to the starting compound and n is equal to 10 through 10,000.

20. A method for producing a silicon network polymer as claimed in claim 19 wherein R in the trihalosilane of general formula (1) is at least one member selected from the class consisting of alkyl groups of 1 to 6 carbon atoms, alkoxy groups of 1 to 6 carbon atoms, phenyl, phenyl substituted by one or more alkyl groups of 1 to 6 carbon atoms, p-alkoxyphenyl groups and naphthyl.

21. A method for producing a silicon network polymer as claimed in claim 19 wherein X in said halosilane of general formula (1) represents chlorine.

22. A method for producing a silicon network polymer as claimed in claim 19 wherein said aprotic solvent is at least one member selected from the class consisting of propylene carbonate, acetonitrile, dimethylformamide, dimethyl sulfoxide, tetrahydrofuran, 1,2-dimethoxyethane, bis(2-methoxyethyl)ether, p-dioxane and methylene chloride.

23. A method for producing a silicon network polymer as claimed in claim 22 wherein said aprotic solvent is at least one member selected from the class consisting of tetrahydrofuran, 1,2-dimethoxyethane, bis-(2-methoxyethyl)ether and p-dioxane.

24. A method for producing a silicon network polymer as claimed in claim 23 wherein said aprotic solvent is selected form the group consisting of tetrahydrofuran, 1,2-dimethoxyethane, and mixtures thereof.

25. A method for producing a silicon network polymer as claimed in claim 19 wherein the concentration of said trihalosilane in said solvent is 0.05 to 20 moles/l.

26. A method for producing a silicon network polymer as claimed in claim 25 wherein the concentration of said trihalosilane in said solvent is 0.2 to 15 moles/l.

27. A method for producing a silicon network polymer as claimed in claim 26 wherein the concentration of said trihalosilane in said solvent is 0.3 to 13 moles/l.

28. A method for producing a silicon network polymer as claimed in claim 19 wherein the anion moiety of said supporting electrolyte is a perchloric acid moiety.

29. A method for producing a silicon network polymer as claimed in claim 28 wherein said supporting electrolyte is lithium perchlorate and/or tetra-n-butylammonium perchlorate.

30. A method for producing a silicon network polymer as claimed in claim 29 wherein said supporting electrolyte is lithium perchlorate.

31. A method for producing a silicon network polymer as claimed in claim 19 wherein the concentration of said supporting electrolyte in said solvent is 0.05 to 5 moles/l.

32. A method for producing a silicon network polymer as claimed in claim 31 wherein the concentration of said supporting electrolyte in said solvent is 0.1 to 3 moles/l.

33. A method for producing a silicon network polymer as claimed in claim 32 wherein the concentration of said supporting electrolyte in said solvent is 0.15 to 1.2 moles/l.

34. A method for producing a silicon network polymer as claimed in claim 19 wherein the two electrodes are composed of the same metal selected from the class consisting of Mg, Al and their alloys.

35. A method for producing a silicon network polymer as claimed in claim 34 wherein the two electrodes are composed of the same metal selected from the class consisting of Mg and its alloys.

36. A method for producing a silicon network polymer as claimed in claim 19 wherein the frequency of the ultrasonic waves is 10 kHz to 70 kHz.

37. A method for producing a silicon network polymer as claimed in claim 19 wherein the output of ultrasonic waves for said sonication is 0.01 to 24 kW per liter of the reaction mixture.

* * * * *